United States Patent
Zoso et al.

(10) Patent No.: US 12,385,742 B2
(45) Date of Patent: Aug. 12, 2025

(54) 3D GEOLOCATION SYSTEM

(71) Applicant: B-TEMIA INC., St-Augustin-de-Desmaures (CA)

(72) Inventors: Nathaniel Zoso, Québec (CA); Victorien Thiaux, Québec (CA); Éric Duplain, Québec (CA); Martin Beaumont, Québec (CA); Stéphane Bédard, Lévis (CA)

( * ) Notice: Subject to any disclaimer, the term of this patent is extended or adjusted under 35 U.S.C. 154(b) by 628 days.

(21) Appl. No.: 16/072,868

(22) PCT Filed: Jan. 25, 2017

(86) PCT No.: PCT/CA2017/000015
§ 371 (c)(1),
(2) Date: Jul. 25, 2018

(87) PCT Pub. No.: WO2017/127914
PCT Pub. Date: Aug. 3, 2017

(65) Prior Publication Data
US 2019/0041220 A1     Feb. 7, 2019

Related U.S. Application Data

(60) Provisional application No. 62/286,896, filed on Jan. 25, 2016.

(51) Int. Cl.
*G01C 21/16* (2006.01)
*G01S 5/14* (2006.01)
*G01S 17/86* (2020.01)

(52) U.S. Cl.
CPC ............ *G01C 21/1652* (2020.08); *G01S 5/14* (2013.01); *G01S 17/86* (2020.01); *G01S 2205/09* (2020.05)

(58) Field of Classification Search
CPC .. G01C 21/165; G01C 21/1652; G01C 22/00; G01C 22/02; G01S 5/14; G01S 17/86; G01S 2205/09
(Continued)

(56) References Cited

U.S. PATENT DOCUMENTS

| 6,522,266 B1 * | 2/2003 | Soehren | G01S 5/017 |
| | | | 600/595 |
| 8,504,292 B1 * | 8/2013 | Cote | G01S 15/66 |
| | | | 701/500 |

(Continued)

FOREIGN PATENT DOCUMENTS

JP     2004062874 A  *  2/2004

OTHER PUBLICATIONS

Rangana, Geodetic Triangulation, Sabaragamuwa University of Sri Lanka, Chapter 1, pp. 1-2 . (Year: 2013).*

(Continued)

*Primary Examiner* — Michael P Nghiem
(74) *Attorney, Agent, or Firm* — McClure, Qualey & Rodack, LLP

(57) ABSTRACT

A three-dimensional (3D) geolocation system for providing the 3D coordinates of a moving person in the absence of a Global Positioning System (GPS) signal. The 3D geolocation system uses biomechanics information about the user provided by two inertial sensors configured to be positioned at the left and right foot-ankle structures and additional sensors configured to measure the spatial orientation of the shanks, thighs and trunk of the user. These sensors can be provided by an exoskeleton or other types of orthotic devices worn by the user.

8 Claims, 4 Drawing Sheets

(58) Field of Classification Search
USPC .......................................................... 702/153
See application file for complete search history.

(56) References Cited

U.S. PATENT DOCUMENTS

| | | | | |
|---|---|---|---|---|
| 2003/0152061 | A1* | 8/2003 | Halsey | G08B 21/02 370/342 |
| 2010/0321244 | A1* | 12/2010 | Kelly | G01S 5/04 342/451 |
| 2011/0208444 | A1* | 8/2011 | Solinsky | A61B 5/1114 702/41 |
| 2011/0313716 | A1* | 12/2011 | Smid | G01C 21/1652 702/141 |
| 2014/0303524 | A1* | 10/2014 | Chen | A61B 5/11 600/595 |
| 2014/0343460 | A1* | 11/2014 | Evans, III | A61B 5/6829 600/595 |
| 2015/0257682 | A1* | 9/2015 | Hansen | G16H 20/30 382/103 |
| 2015/0309563 | A1* | 10/2015 | Connor | G06F 3/017 73/865.4 |
| 2015/0327022 | A1* | 11/2015 | Lin | G01S 5/0263 455/456.1 |

OTHER PUBLICATIONS

English translation of JP 2004-62874, Feb. 26, 2004. (Year: 2004).*

* cited by examiner

3D GEOLOCATION SYSTEM

CROSS-REFERENCE TO RELATED APPLICATIONS

This application claims the benefits of U.S. provisional patent application No. 62/286,896 filed on Jan. 25, 2016, which is herein incorporated by reference.

TECHNICAL FIELD

The present disclosure relates to a 3D geolocation system, more specifically, the present disclosure relates to a 3D geolocation system that operates in the absence of a GPS signal.

BACKGROUND

Several activities require the knowledge of a person's position at all times. For example, in the case of a firefighter, should he or she become incapacitated the squad leader has to be able to send help to the location of the incapacitated firefighter. The rescue team has very limited visibility and the search area is usually restricted; the quicker the search is, the higher the chances of saving the incapacitated firefighter are. The same scenario applies to a soldier moving inside a building or underground where there is no access to a Global Positioning System (GPS) signal.

Normally, the GPS will do. However, in some buildings the reception of the GPS signal can be extremely limited if present at all. Without GPS, there is no trivial solution at the present, other than dead-reckoning. This algorithm uses an inertial sensor and, essentially, calculates the acceleration in the global coordinates (knowing the orientation of the sensor, it can transform the measured acceleration of the local reference (i.e. sensor) to the global coordinates system (i.e. world)). This numerical integration tends to accumulate error, normally around 3% of distance traveled. After 100 meters traveled without GPS, the error is +3 meters, therefore too large to know exactly on which floor the user needing help is located on, thus requiring the sending of three rescue teams instead of a single one (i.e. the top, middle and bottom floors) or taking up to triple the usual time for a single team. Furthermore, inertial navigation requires a "reset" when the foot is in contact with the ground. Without this reset the error increases exponentially. Needless to say, if the reset happens at the wrong time, the error increases.

Accordingly, there is a need for a precise 3D geolocation system for providing the 3D coordinates a moving person in the absence of a GPS signal.

SUMMARY

The present disclosure provides a geolocation system for monitoring of the displacement of a user, comprising:
  a pair of inertial sensors configured to be positioned at a left and a right foot-ankle structures of the user, the inertial sensors providing biomechanics information of the user;
  at least one pair of spatial orientation sensors providing information indicative of the spatial orientation of a right and a left thighs and a trunk of the user;
  at least one pair of spatial orientation sensors providing information indicative of the spatial orientation of a right and a left shanks of the user;
  a processor in communication with the inertial sensors and the spatial orientation sensors via a communication link, the processor having an associated memory comprising instructions stored thereon, that when executed on the processor perform the steps of:
    receiving the biomechanics information and the information indicative of the spatial orientation of the right and the left thighs, the trunk and the right and the left shanks of the user;
    calculating the 3D coordinates of the user using the biomechanics information and the information indicative of the spatial orientation of the right and the left thighs, the trunk and the right and the left shanks; and
    providing the calculated 3D coordinates of the user;
  wherein the biomechanics information and the information indicative of the spatial orientation of the right and the left thighs, the trunk and the right and the left shanks are continuously provided to the processor who continuously calculates the 3D coordinates of the user, thus allowing the monitoring of the displacement of the user.

The present disclosure also provides a 3D geolocation system as disclosed above, wherein:
  the at least one pair of spatial orientation sensors providing information indicative of the spatial orientation of a right and a left thighs and a trunk of the user is a pair of inertial sensors configured to be positioned at a left and right leg-knee or thigh-hip structures of the user, the inertial sensors providing biomechanics information of the user; and
  the at least one pair of spatial orientation sensors providing information indicative of the spatial orientation of a right and left shanks of the user is a pair of angular position sensors configured to be positioned at a right and a left knees and hips.

The present disclosure further provides a 3D geolocation system as disclosed above, wherein the biomechanics information of the user includes the acceleration at each of the inertial sensors configured to be positioned at the left and the right foot-ankle structures of the user and wherein the step of calculating the 3D coordinates of the user includes the sub-steps of:
  rotating the accelerations of each of the inertial sensors configured to be positioned at the left and the right foot-ankle structures of the user relative to the feet of the user by applying a global reference system rotation matrix;
  doubly integrating the rotated accelerations to obtain a position for each of the inertial sensor configured to be positioned at the left and the right foot-ankle structures of the user
  generating a posture of the user using the information indicative of the spatial orientation of the spatial orientation of the right and the left thighs, the trunk and the right and the left shanks of the user;
  merging the position of each inertial sensor with the posture of the user using a sensor fusion algorithm to obtain the 3D coordinates.

The present disclosure still further provides a 3D geolocation system as described above, wherein the inertial sensors and the spatial orientation sensors are provided by one of an exoskeleton and a pair of orthotic devices worn by the user.

The present disclosure also provides a 3D geolocation system as described above, further comprising a remote monitoring system in communication with the processor via a communication link, the communication link being a wired communication link, a wireless communication link or a combination of both.

The present disclosure further provides a 3D geolocation system as described above, further comprising at least three radio frequency sensor beacons to be positioned around a structure in which the displacement of the user is being monitored and wherein the instructions stored in the memory, when executed on the processor perform the further steps of triangulating the position of the user and resetting the position of the user upon receiving signals from at least three of the radio frequency sensor beacons.

The present disclosure still further provides a 3D geolocation system as described above, further comprising at least one lidar-type sensor providing a position of walls of a structure in which the displacement of the user is being monitored and wherein the instructions stored in the memory, when executed on the processor perform the further step of halting the sub-step of doubly integrating the rotated accelerations when the position of walls indicate that the user is motionless in order to limit drift error. The lidar-type sensor may be provided by one of an exoskeleton and a pair of orthotic devices worn by the user.

BRIEF DESCRIPTION OF THE FIGURES

Embodiments of the disclosure will be described by way of examples only with reference to the accompanying drawings, in which.

Similar references used in different Figures denote similar components.

DETAILED DESCRIPTION

Generally stated, the non-limitative illustrative embodiment of the present disclosure provides a three-dimensional (3D) geolocation system for providing the 3D coordinates of a moving person in the absence of a Global Positioning System (GPS) signal. The 3D geolocation system uses two inertial sensors configured to be positioned at the left and right foot-ankle structure and a series of sensors to measure the spatial orientation of each segment of the lower limbs (shanks, thighs, trunk) of the user. In an illustrative embodiment, the 3D geolocation system uses two additional inertial sensors at the left and right leg-knee or thigh-hip structure as well as sensors providing information indicative of the angular positions of the left and right knee and thigh, which may be provided by the exoskeleton or orthotic devices worn by the user, such as described, for example, in U.S. Pat. No. 9,370,439 entitled "LOAD DISTRIBUTION DEVICE FOR HUMAN JOINTS". This determination of the 3D coordinates of the user is performed using biomechanics information about the user from the inertial sensors combined with the knee and hip angles.

Starting from a known position and orientation (for example last known GPS position and orientation), the 3D geolocation system uses the orientation calculated by the inertial sensors to rotate the accelerations into the global coordinates system. A double integration with appropriate filtering and error correction gives the position of each inertial sensor. At the same time, the orientation of each segment (shank, thigh, trunk) allow the determination of the relative position of each inertial sensor with regard to the other inertial sensors, which help minimize the maximal error in each step. A data fusion algorithm using all inertial sensors data as well as the segments orientation (for example knee and hip angles) allows for an increased accuracy in calculating the location of the user.

Figure 1:
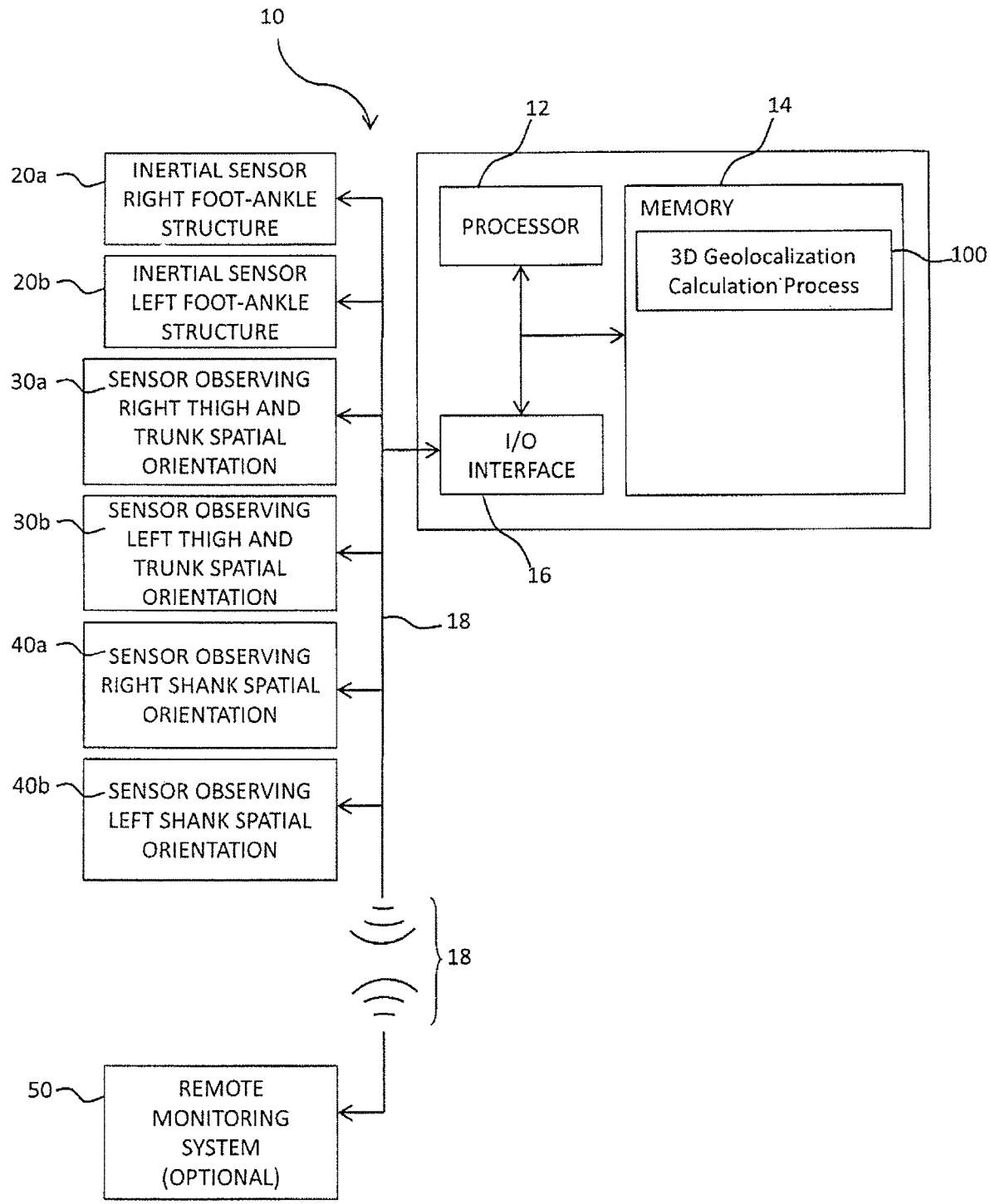
FIG. 1 is a schematic representation of the 3D geolocation system for the 3D geolocation of a moving body without a GPS signal.

Referring to FIG. 1, the 3D geolocation system 10 includes a processor 12 with an associated memory 14 comprising instructions stored thereon, that when executed on the processor 12, perform the steps of the 3D geolocation calculation process 100, which process will be further described below. The 3D geolocation system 10 further includes an input/output (I/O) interface 16 for communication with inertial sensors located at the right 20a and left 20b foot-ankle structures, sensors observing the right 30a and left 30b thighs and trunk spatial orientations, sensors observing the right 40a and left 40b shanks spatial orientations, and an optional remote monitoring system 50 through communication link 18, which may be wired, wireless or a combination of both.

Figure 2:
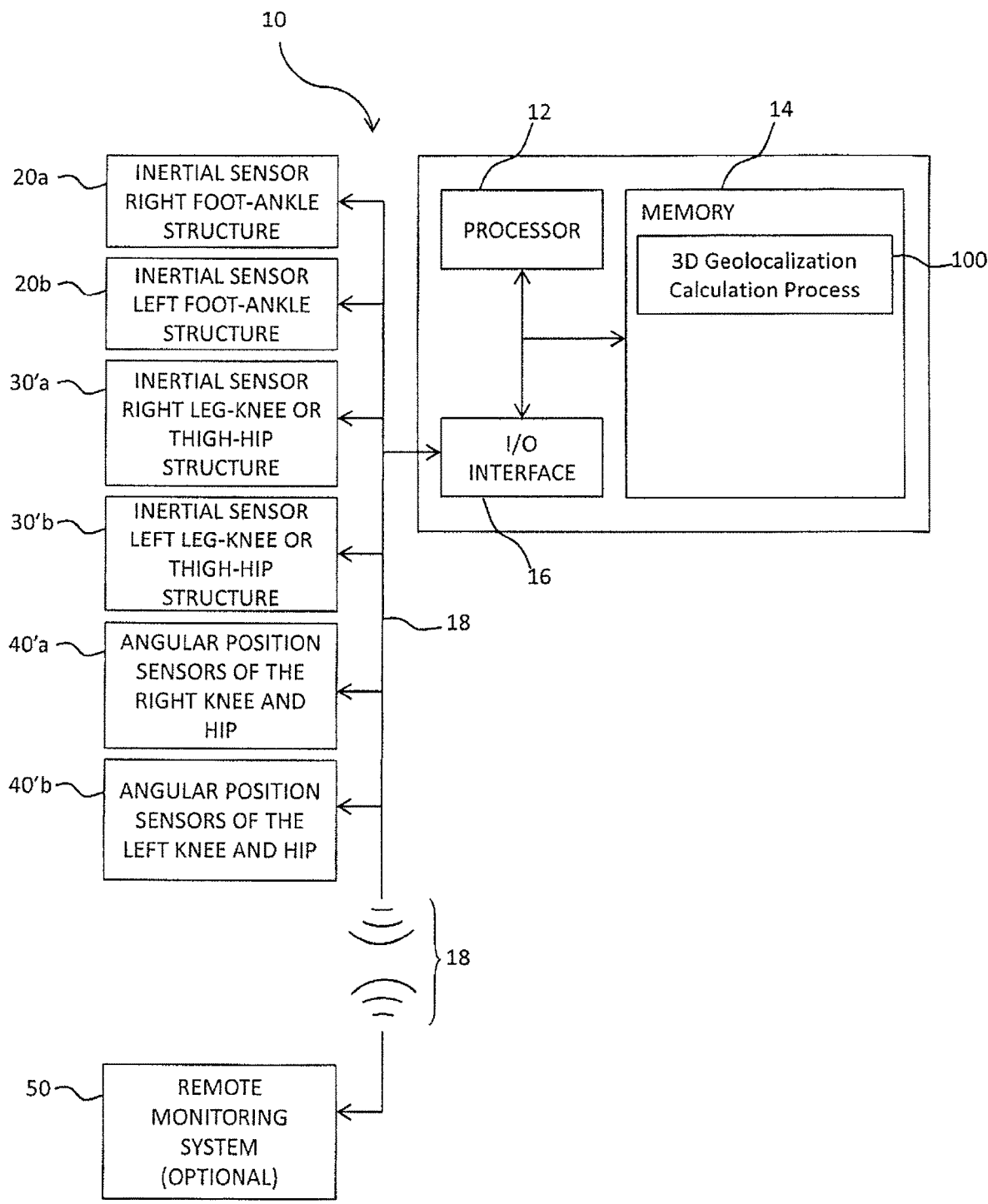
FIG. 2 is a schematic representation of an alternative embodiment of of the 3D geolocation system of FIG. 1.

In an illustrative embodiment of the 3D geolocation system 10, shown in FIG. 2, the sensors observing the right 30a and left 30b thigh and trunk spatial orientations take the form of inertial sensors positioned at the right 30'a and left 30'b leg-knee or thigh-hip structures, respectively, and the sensors observing the right 40a and left 40b shank spatial orientations take the form of angular position sensors of the right 40'a and left 40'b knees and hips, respectively.

It is to be understood that the angular position sensors 40'a, 40'b may take the form of any sensors providing information indicative of angular position or from which angular position may be generated as the knee and hip angles may be determine by direct measurement or deduced from biomechanics information provided by a variety of types of sensors.

The 3D geolocation system 10 obtains biomechanics information, for example the orientation, the measured rotation and the measured acceleration, from each of the inertial sensors 20a, 20b, 30'a, 30'b as well as the angular position sensors of the knees and hips 40'a, 40'b, to calculate the 3D coordinates of the user. Optionally, this information is provided to the remote monitoring system 50 through communication link 18 in order to allow the monitoring of the displacement of the user.

Figure 3:
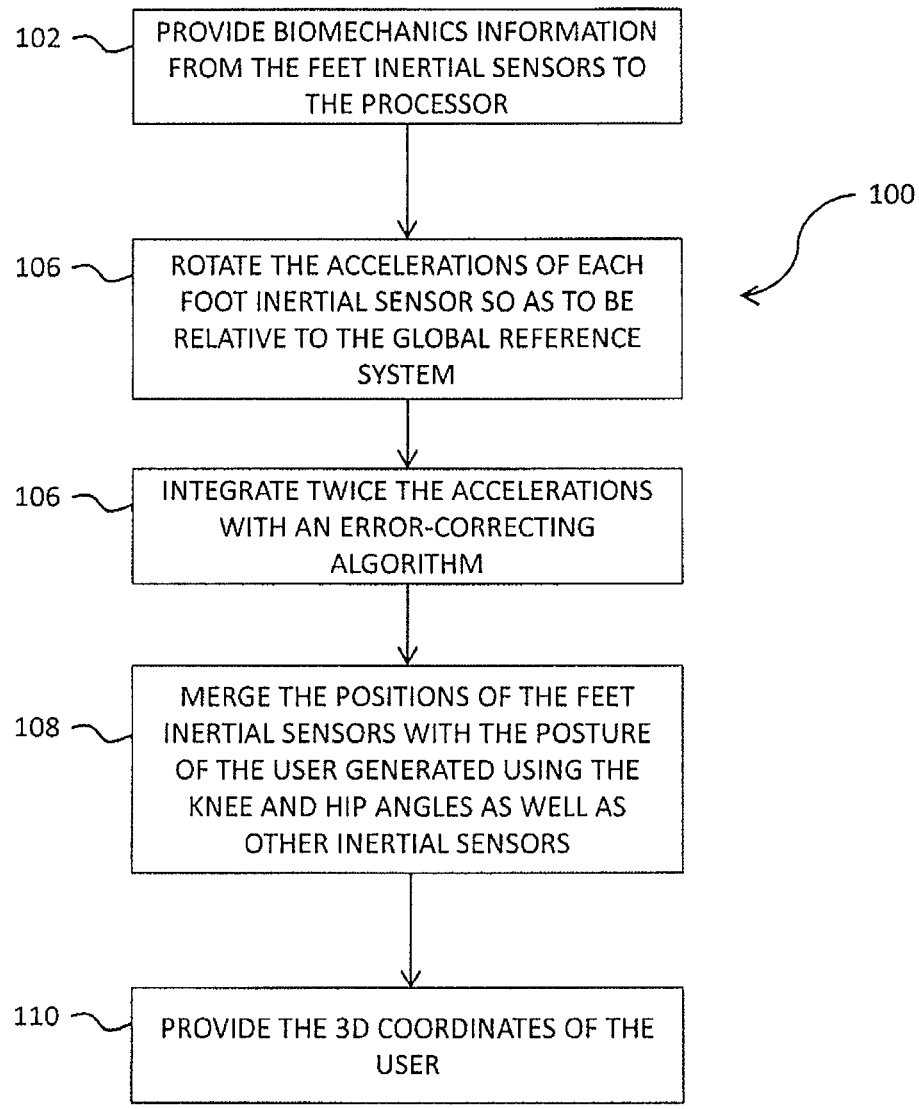
FIG. 3 is a flow diagram of the 3D geolocation calculation process in accordance with the illustrative embodiment of the present disclosure.

Referring now to FIG. 3, there is shown a flow diagram of an illustrative example of the 3D geolocation calculation process 100 executed by the processor 12 (see FIGS. 1 and 2). Steps of the process 100, executed with each step of the user, are indicated by blocks 102 to 110.

The process 100 starts at block 102 where biomechanics information from each of the inertial sensors 20a, 20b, 30'a, 30'b and angular position of the knee and hip sensors 40'a, 40'b is provided to the processor 12 (i.e. inertial sensors 20a, 20b, sensors observing the right 30a and left 30b thighs and trunk spatial orientations and sensors observing the right 40a and left 40b shanks spatial orientations).

Then, at block 104, the accelerations, relative to each foot inertial sensor 20a, 20b, are rotated, using a rotation matrix, to be relative to the global reference system. For example, suppose the inertial sensors 20a, 20b have a roll, pitch and yaw of 10, −20 and 30 degrees, respectively, with regard to the global reference system, then a rotation matrix, equivalent to a roll, pitch and yaw of −10, 20 and 30 degrees, is applied to the acceleration vector of each of the inertial sensors 20*a*, 20*b* so that the accelerations are expressed with regards to the global reference system where a vertical acceleration corresponds to the opposite of gravity rather than the top/bottom of the inertial sensors 20*a*, 20*b*.

At block 106, the accelerations are doubly integrated (i.e. the accelerations are integrated in order to obtain the velocity with regard to the velocity at time t=0 and then the velocity is integrated in order to obtain the position with regard to the position at time t=0) and error-corrected to give an initial position for each inertial sensor 20*a*, 20*b*.

At block 108, the position of each inertial sensor 20*a*, 20*b* is merged with a sensor fusion algorithm with the posture of the user generated using the knee and hip angles provided by the inertial sensors 30'*a*, 30'*b* and the angular position sensors 40'*a*, 40'*b*, to give a single corrected body set of 3D coordinates.

Finally, at block 110, the 3D coordinates of the user are provided.

Figure 4:
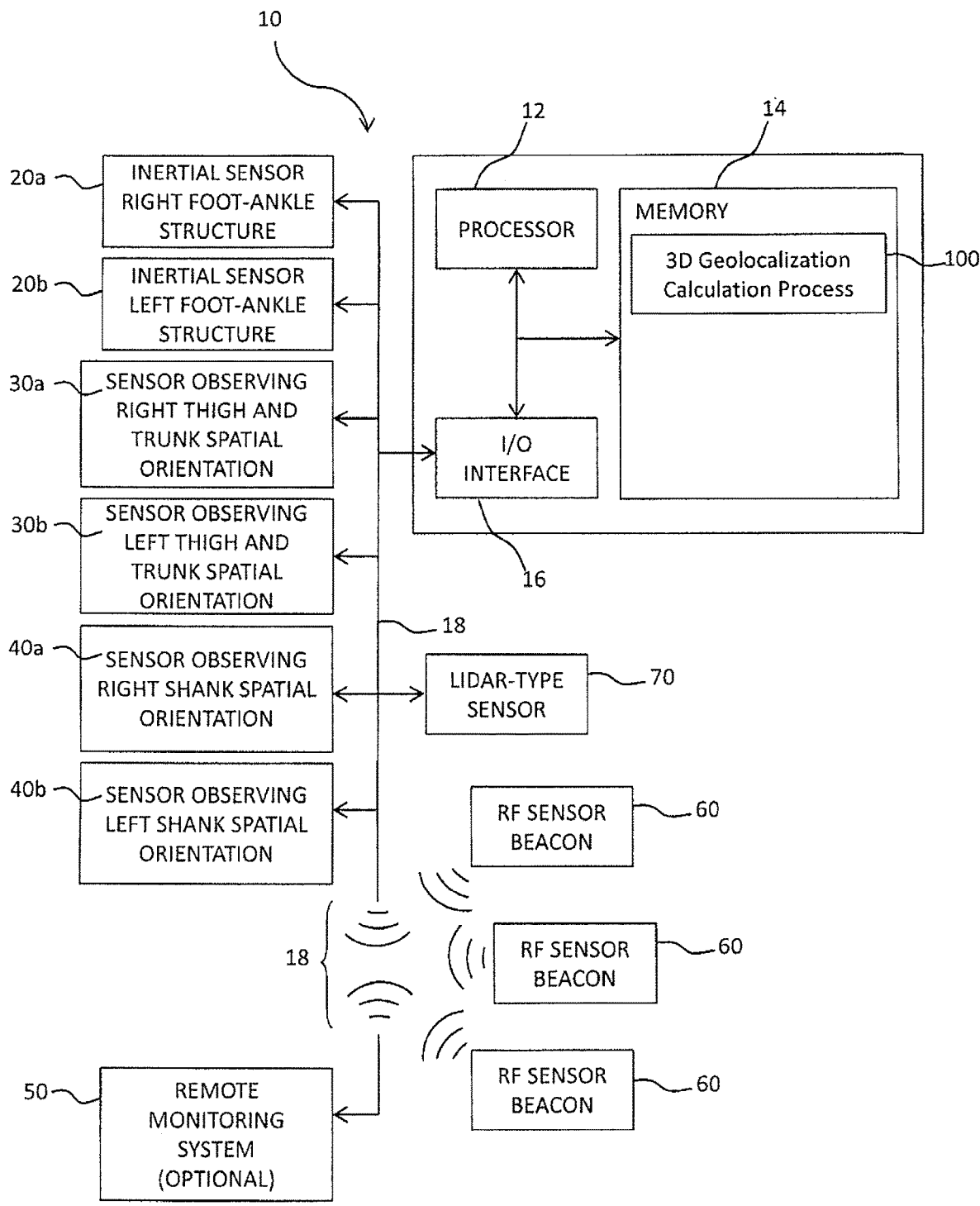
FIG. 4 is a schematic representation of a further alternative embodiment of the 3D geolocation system of FIG. 1.

Referring to FIG. 4, there is shown a further alternative embodiment of the 3D geolocation system 10 that further includes three or more radio frequency (RF) sensor beacons 60 to be positioned around a building or other structure in which the user is moving. These RF sensor beacons 60 can be used to triangulate the position of the user so that whenever the processor 12 receives signals from at least three of the RF sensor beacons 60, the 3D geolocation calculation process 100 can precisely triangulate the position of the user and reset the user's position. In between readings, the 3D geolocation calculation process 100 relies on the signals provided by the various sensors 20*a*, 20*b*, 30*a*, 30*b*, 30'*a*, 30'*b*, 40*a*, 40*b*, 40'*a*, 40'*b* to determine the user's position.

On this alternative embodiment, the 3D geolocation system 10 may also include at least one lidar-type sensor 70 (or other mapping sensor) provided by the exoskeleton or orthotic devices worn by the user. The at least one lidar-type sensor 70 reads the position of the walls and helps the 3D geolocation calculation process 100 limit drift error. When the signal from the at least one lidar-type sensor 70 indicates that the user is relatively motionless with regards to its surroundings, the 3D geolocation calculation process 100 will halt the double integration of the accelerations at block 106 in order to eliminate current velocity error.

It is to be understood that in the above described alternative embodiment, the at least three of the RF sensor beacons 60 and the at least one lidar-type sensor 70 may be used separately or in combination. It is to be further understood that the at least three of the RF sensor beacons 60 and/or the at least one lidar-type sensor 70 may be used with the alternative embodiment of the 3D geolocation system 10 shown in FIG. 2.

Although the present disclosure has been described by way of particular non-limiting illustrative embodiments and examples thereof, it should be noted that it will be apparent to persons skilled in the art that modifications may be applied to the present particular embodiment without departing from the scope of the present disclosure as hereinafter claimed.

We claim:

1. A 3D geolocation system for continuously monitoring a location of a user resulting from a displacement of the user, comprising:

a pair of inertial sensors configured to be positioned at a left and a right foot-ankle structures of the user, the inertial sensors providing biomechanics information of the user;

at least one pair of spatial orientation sensors providing information indicative of the spatial orientation of a right and a left thighs and a trunk of the user;

at least one pair of spatial orientation sensors providing information indicative of the spatial orientation of a right and a left shanks of the user;

a processor in communication with the inertial sensors and the spatial orientation sensors via a communication link, the processor having an associated memory comprising instructions stored thereon, that when executed on the processor perform the steps of:

receiving the biomechanics information and the information indicative of the spatial orientation of the right and the left thighs, the trunk and the right and the left shanks of the user;

calculating the 3D coordinates of the user using the biomechanics information and the information indicative of the spatial orientation of the right and the left thighs, the trunk and the right and the left shanks, wherein calculating the 3D coordinates of the user is performed by executing the sub-steps of:

expressing the accelerations of each of the inertial sensors configured to be positioned at the left and the right foot-ankle structures of the user relative to corresponding feet of the user in a global reference system by applying a global reference system rotation matrix;

doubly integrating the accelerations expressed in the global reference system to obtain a position for each of the inertial sensor configured to be positioned at the left and the right foot-ankle structures of the user;

generating a posture of the user using the information indicative of the spatial or ientation of the spatial orientation of the right and the left thighs, the trunk and the right and the left shanks of the user;

merging the position of each inertial sensor with the posture of the user using a sensor fusion algorithm to obtain the 3D coordinates; and providing the location of the user using the calculated 3D coordinates of the user; wherein the biomechanics information and the information indicative of the spatial orientation of the right and the left thighs, the trunk and the right and the left shanks are continuously provided to the processor which continuously calculates the 3D coordinates of the user, thus allowing continuous monitoring of the location of the user resulting from the displacement of the user.

2. The 3D geolocation system of claim 1, wherein:

the at least one pair of spatial orientation sensors providing information indicative of the spatial orientation of a right and a left thighs and a trunk of the user is a pair of inertial sensors configured to be positioned at a left and right leg-knee or thigh-hip structures of the user, the inertial sensors providing biomechanics information of the user; and the at least one pair of spatial orientation sensors providing information indicative of the spatial orientation of a right and left shanks of the user is a pair of angular position sensors configured to be positioned at a right and a left knees and hips.

3. The 3D geolocation system of claim 1, wherein the inertial sensors and the spatial orientation sensors are provided by at least one of an exoskeleton or a pair of orthotic devices worn by the user.

4. The 3D geolocation system of claim 1, further comprising a remote monitoring system in communication with the processor via a communication link.

5. The 3D geolocation system of claim 4, wherein the communication link is selected from a group consisting of a wired communication link, a wireless communication link and a combination of wired and wireless communication link.

6. The 3D geolocation system of claim 1, further comprising at least three radio frequency sensor beacons to be positioned around a structure in which the displacement of the user is being monitored and wherein the instructions stored in the memory, when executed on the processor perform the further steps of triangulating a position of the user and resetting the position of the user upon receiving signals from at least three of the radio frequency sensor beacons.

7. The 3D geolocation system of claim 1, further comprising at least one lidar-type sensor providing a position of walls of a structure in which the displacement of the user is being monitored and wherein the instructions stored in the memory, when executed on the processor perform the further step of halting the sub-step of doubly integrating the accelerations expressed in the global reference system when the position of walls remains constant, indicating that the user is motionless in order to limit drift error.

8. The 3D geolocation system of claim 7, wherein the lidar-type sensor is provided by at least one of an exoskeleton or a pair of orthotic devices worn by the user.

* * * * *